US009939264B2

(12) United States Patent
Barfield et al.

(10) Patent No.: US 9,939,264 B2
(45) Date of Patent: Apr. 10, 2018

(54) METHOD AND SYSTEM FOR DETERMINING THE HEIGHT OF A DEVICE ABOVE GROUND

(71) Applicants: James Barfield, Atlanta, GA (US); Tom Taylor, Atlanta, GA (US)

(72) Inventors: James Barfield, Atlanta, GA (US); Tom Taylor, Atlanta, GA (US)

(73) Assignee: Verizon Telematics Inc., Atlanta, GA (US)

( * ) Notice: Subject to any disclaimer, the term of this patent is extended or adjusted under 35 U.S.C. 154(b) by 1114 days.

(21) Appl. No.: 13/719,122

(22) Filed: Dec. 18, 2012

(65) Prior Publication Data

US 2014/0172351 A1  Jun. 19, 2014
US 2017/0045359 A9  Feb. 16, 2017

Related U.S. Application Data

(60) Provisional application No. 61/578,855, filed on Dec. 21, 2011.

(51) Int. Cl.
*G01C 5/06* (2006.01)
*G01S 19/52* (2010.01)

(52) U.S. Cl.
CPC ............... *G01C 5/06* (2013.01); *G01S 19/52* (2013.01)

(58) Field of Classification Search
CPC .................................. G01C 5/06; G01S 19/52
See application file for complete search history.

(56) References Cited

U.S. PATENT DOCUMENTS

| 5,295,085 | A  | * | 3/1994  | Hoffacker  | 73/384        |
|-----------|----|---|---------|------------|---------------|
| 2007/0040732 | A1 | * | 2/2007  | Burgett    | G01C 5/06     |
|           |    |   |         |            | 342/120       |
| 2007/0276611 | A1 | * | 11/2007 | Lorimer    | G01N 27/48    |
|           |    |   |         |            | 702/25        |
| 2008/0234935 | A1 | * | 9/2008  | Wolf       | G01C 21/16    |
|           |    |   |         |            | 701/472       |

(Continued)

OTHER PUBLICATIONS

David M. Lane, Introduction to Linear Regression, Online Statistics Education a Multimedia Course of Study (onlinestatbook.com), May 21, 2011.*

*Primary Examiner* — Kyle R Quigley

(57) ABSTRACT

A device updates a value representing its current height above ground when it detects a height change. The device uses the slope calculated from collected barometric pressure data samples to calculate height change during a period when the value of the slope exceeds a predetermined value. The device also analyzes a predetermined number of barometric pressure sensor data samples preceding and succeeding a height change indicated by the slope change. The device performs an evaluation, i.e., determining the difference between an average of the preceding and succeeding samples, to determine a height change. The device may select either the slope-of-the-curve-during-the-height-change-period method or the difference-between-the-averages method based on meeting a criterion. The processor de-energizes a GPS circuit, height determination method, and sets the height above ground to zero if it detects movement. Placing the device on a charger resets the device's height value to the charger height above ground.

20 Claims, 8 Drawing Sheets

(56) References Cited

U.S. PATENT DOCUMENTS

| | | | |
|---|---|---|---|
| 2009/0322540 A1* | 12/2009 | Richardson | A61B 5/0002 340/573.7 |
| 2011/0128183 A1* | 6/2011 | Marshall | G01S 5/0252 342/357.29 |
| 2011/0144910 A1* | 6/2011 | Sakashita | G01C 5/06 701/469 |
| 2011/0205115 A1* | 8/2011 | Gronemeyer | G01S 19/34 342/357.74 |
| 2012/0290253 A1* | 11/2012 | Barrett et al. | 702/150 |
| 2013/0197856 A1* | 8/2013 | Barfield | G01P 15/00 702/141 |

* cited by examiner

METHOD AND SYSTEM FOR DETERMINING THE HEIGHT OF A DEVICE ABOVE GROUND

CROSS REFERENCE TO RELATED APPLICATION

The present application claims priority under 35 U.S.C. 119(e) to U.S. Provisional Patent Application No. 61/578,855 filed on Dec. 21, 2011, entitled "Method and system for determining the height of a device above ground," which the present application incorporates by reference in its entirety.

FIELD

The invention relates to determining, the height above ground, in particular wearable mobile devices with wireless communication capabilities for determining and reporting the height of the device in an emergency event.

DETAILED DESCRIPTION

Figure 1:
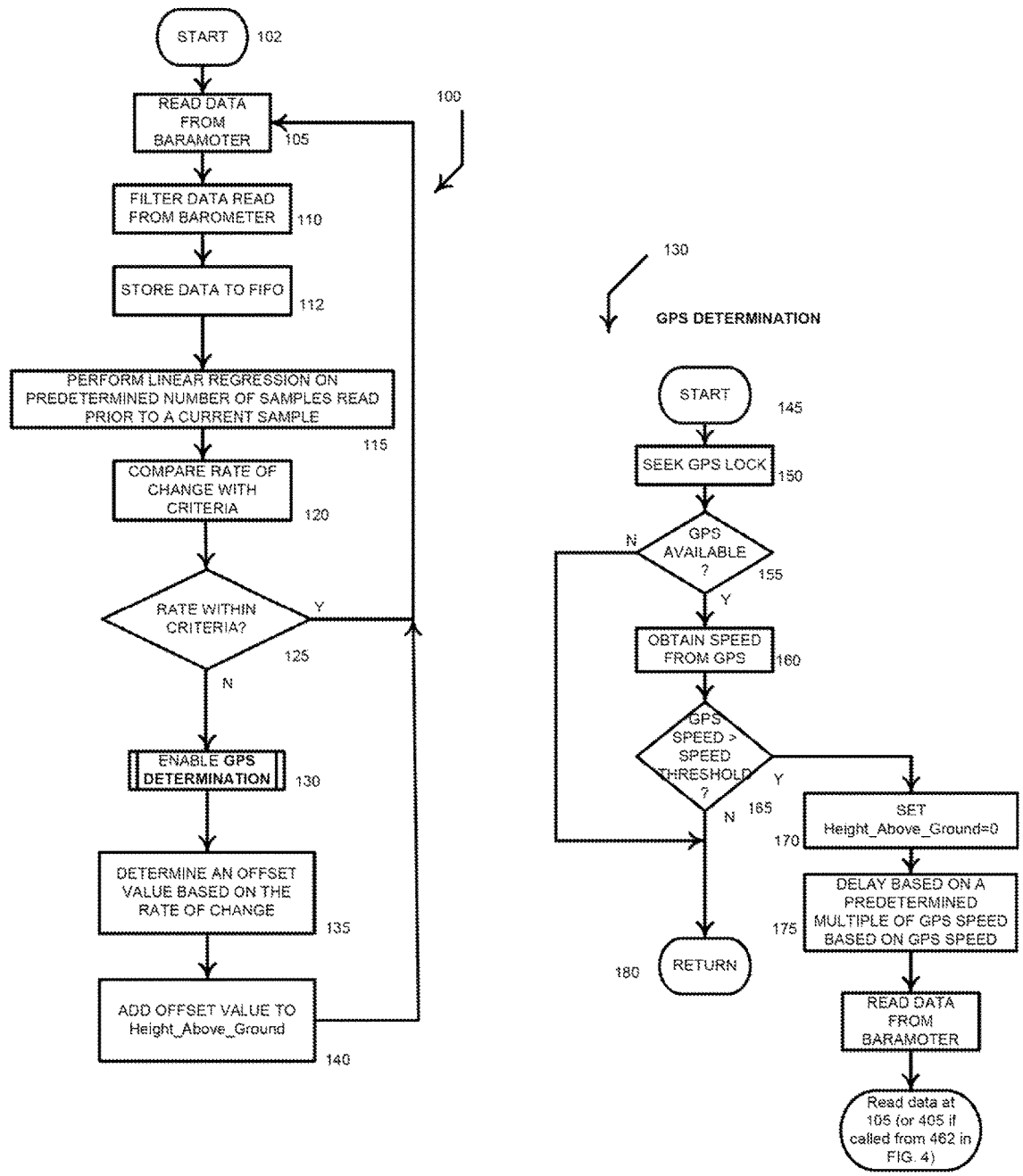
FIG. 1 illustrates a flow diagram of a method for height determination with GPS checks that uses a pressure rate of change approach to determine height above the ground.

One of ordinary skill in the art will appreciate that some terms may be interchangeable, but are used herein to connote specific functionality. For example, one skilled in the art may use the terms cache, buffer, queue, and memory interchangeably. However, as used herein, the term 'buffer' typically refers to temporarily storing sample data until an event is detected and the data currently in the buffer is stored to a different memory for further processing and use.

Height determination is used to determine the height above the ground floor (0 feet) that a device is located. To locate the device's height off the ground, a pressure sensor and a GPS sensor is used in conjunction with methods described to judge the devices height. In the case of an emergency event in an emergency event notification device, this method can be used to locate the floor, or height off the ground, that a person or object that contains the sensors and method. There are two overlying approaches to determine height above the ground: Sensing for changes in pressure and adjusting a height measurement based on the changes in pressure (an approach based on relative changes) and sensing for absolute changes in pressure above sea level then using topological maps to determine the height above the ground (an approach based on absolute changes in pressure). Because of the compounded large error for use in locating in a building or structure associated with an absolute approach to height determination, this approach is ignored.

Three aspects are described that use changes in pressure:

1) an aspect that measures the height above a fixed point based on a rate of change in pressure and a difference between a pre-rate of change pressure and a post rate of change pressure that corresponds to a change in height;

2) an aspect that resets the height to ground level when the device is in a car; and 3) an aspect that resets the height to the users charger level when the device is placed on a charger. To reset to a charger's level the value stored as the height of the device, the level of the charger is determined. Therefore, the method learns when the device is placed on the charger in order to improve the accuracy of knowing the height above ground the charger is located. This is referred to as the charger height method.

A height change event is when the device calculates a change in height relative to a reference point. The ground level is indicated by a reference point of zero elevation. Determining the Height of a Device Using, a Relative Change in Pressure Multiple approaches to determining the height change of a device from a starting point to another point above or below the starting point are described that base the determination to height above the ground. The approaches, or methods, make several common assumptions given below. One assumption is that a change in pressure of 1 Pascal corresponds to a change in 0.277 foot at sea level. An assumption that this change remains relatively linear for regions other than at sea level is used to constantly check for a rapid change in pressure to indicate that a device is correspondingly rising or lowering in altitude.

Turning now to FIG. 1, the figure illustrates a method 100 for determining pressure change and a rate of change values of pressure upon a device. Using these determined values, method 100 calculates a change in altitude of a device by performing the steps shown in the figure. Method 100 begins at step 102 and progresses to 105 when a barometric pressure measuring component of a device produces an output signal corresponding to the barometric pressure surrounding the device. The device that includes the barometric measuring component may be part of a phone, smart phone, personal emergency response system ("PIERS"), or part of a mobile personal emergency response system ("MPERS"). These devices are typically wearable by a user. Other devices that may use a barometric pressure measuring component include fitness equipment, hiking equipment, watches, cell phones, package tracking devices, tablet computers, computers, tracking devices, power tools, home improvement devices, luggage, luggage tracking devices, firefighting equipment, and containers. A processor in the device coupled with the barometric pressure sensor reads data produced from the sensor and performs a filtering operation on the read, or sampled, data at step 110.

The processor performs the filtering primarily to mitigate, nullify, or otherwise minimize the effects of noise on the data samples. After filtering, the processor stores the filtered data samples to a FIFO buffer at step 112 and then performs a linear regression on the sampled data in the FIFO buffer at step 115. Performing a linear regression operation results in a best fit line of the sampled pressure data samples. The processor performs the linear regression on a predetermined number of samples, typically determined by a buffer size, and determines a slope of the best fit line at step 115. Assuming a periodic sample rate, the buffer size would correspond to a predetermined period over which the processor performs the linear regression. Preferably, the buffer is a First-In-First-Out ("FIFO") buffer and the processor performs the linear regression on the sample data values in the buffer, even if the buffer contains fewer data samples than its capacity.

At step 120, the processor evaluates the results of the linear regression and compares the slope of the best fit line of the sample data values in the buffer to a predetermine slope criteria. The criteria may include a criteria value for a positive slope, and a different criterion for a negative slope. Or, in evaluating the linear regression of the data sample values, the processor may determine an absolute value, or a magnitude, of the slope, of the sample data values and then compare the magnitude to a singular magnitude value. Since barometric pressure typically changes during a brief period (e.g., less than one minute) as elevation changes, a change in pressure measured by a barometric pressure sensor typically corresponds to a change in elevation of the sensor. If the processor determines at step 125 that the rate of change of pressure (and thus elevation which corresponds to the slope of the best fit line of the sample data values, exceeds the criterion, method 100 advances to step 130. If the slope does not exceed the criterion, or criteria, method 100 returns to step 105. Continuing with the description of method 100 of the processor at step 125 determining that the slope of the best fit line exceeds the criteria, the criteria is preferably chosen to correspond with a rate of change associated with a slow moving building elevator used for human travel—if the magnitude of the slope of the best fit line is greater than the predetermined criterion/criteria a threshold value) then method 100 causes processor to seek GPS lock from a GPS processor/circuitry coupled to the processor at step 130. Seeking a GPS lock provides information to processor regarding the type of motion that may have caused the magnitude of the best-fit-line to exceed the predetermined criterion.

Although a device that includes a GPS circuit/processor can transmit a signal providing its latitude and longitude coordinates, if a person wearing a PERS, or and MPERS, places a distress call or sends a distress message from a multi-level building corresponding to the location coordinates, emergency personnel may have difficulty locating an individual needing help. Knowing the floor where the distress signal originates typically will speed the locating of the individual, or the device of the individual, sending the message. Method 100, typically performed by a processor, generally maintains a value, or value stored in a variable, that corresponds to a current, or most recently determined, height of the device. Method 100 and other methods described herein, adjust the value stored as the most recent height based on criteria and data other than just GPS data, which typically can provide information that can indicate elevation. The GPS-provided elevation information may not have high accuracy though, especially when in a building where GPS lock may not be available.

Thus, when subroutine method 130 executes, it starts at step 145 after being called from step 130 in method 100. At step 150, method 130 causes a processor to apply power to a GPS circuit, or receiver, and seek a GPS lock. As one skilled in the art will appreciate, the terminology "GPS lock" refers to a GPS receiver seeking and receiving signals from multiple satellites to enable determination of the location of the GPS receiver. If the GPS receiver cannot obtain a lock to satellite signals at step 155, method 130 follows the path from step 155, causes the processor to remove power from the GPS circuitry, and method 130 returns to method 100 which then performs step 135.

However, if the GPS receiver can obtain a lock at step 150, method 130 follows the 'Y' path from step 155 and obtains a speed determination using received GPS signals at step 160. After determining the speed, method 130 turns off the GPS receiver circuit.

If the speed is less than a predetermined threshold, or criterion, the method follows the 'N' path from step 165 and returns to method 100 and which then performs step 135. If, however, the determination at step 165 indicates that the speed as determined from GPS signals exceeds the threshold, method 130 follows the 'Y' path from step 165. At step 170, method 130 sets the value of the variable corresponding to the height of the device above the ground to zero. The predetermined threshold speed preferably corresponds to a speed that typically only an automobile can attain, but the threshold speed can be configured to correspond to speeds of their vehicles, such as a golf cart, a scooter, a bicycle and the like.

The method assumes that if the GPS receiver obtains a lock, and that the speed as determined from evaluation of GPS signal information exceeds the threshold, the device is in an automobile, or other mode of transportation, that operates at substantially ground level. Thus, method 130 sets the height_above_ground variable to zero at step 170 when the speed of the device having the GPS receiver exceeds the threshold. After determining at step 165 that the device is traveling faster than the predetermined threshold, and the rescuing of the current height variable at step 170, method 130 waits a period of time at step 175 and then ends and returns to method 100.

The wait period of step 175 is based on a predetermined formula that evaluates the speed determined from the GPS information at step 160. For example, if the GPS speed determined at step 160 is 50 mph or above, the wait period of step 175 will be longer than if the speed determined at step 160 is only 10 mph. The assumption that 50 miles per hour or greater typically corresponds to speeds along a limited access highway translates into a longer wait period for speeds that indicate travel on a highway. The longer the wait time, the longer the time before returning to method 100, which results in the passage of more time before applying power to the GPS receiver to obtain speed information again. Waiting a longer period before seeking a GPS lock again when a vehicle is likely on a high speed road avoids wasting power in applying power to, or 'waking up', the GPS receiver while the device that comprises it is likely not inside a building with an elevator—if the device is not inside a building with multiple floors, there is no need to adjust the Height_Above_Ground variable value.

When method 130 returns to method 100 at step 135, the processor determines at step 135 an offset value based on the rate of change determined at step 115. Preferably, the determination of the offset results from multiplying the slope of the best fit line by the period corresponding to the number of samples for which the linear regression was performed. Since the slope of the best fit line will be in terms of pressure per second, multiplying by the period will give a value in terms of pressure. As discussed above, the processor then uses the conversion factor of 0.277 ft./Pa, or other appropriate unit conversion factor, to convert the pressure value to a corresponding number of feet. The processor then adds the value in terms of feet to the Height_Above_Ground variable at step 140, and then method 100 returns to step 105.

Thus, a processor performing the steps of methods 100 and 130 have adjusted the value of the Height_Above_Ground variable by a change in height amount if the performing of the methods' steps determine that the device containing a pressure sensor changed height when not traveling in a vehicle. If the performing of the steps of methods 100 and 130 determine that the change in height occurred while traveling in a vehicle, the methods adjust the Height_Above_ Ground value to zero and cause the processor to continue sampling data from the pressure sensor.

In summary, performing linear regression on pressure data generated by a barometric pressure sensor results in a rate of change of pressure value. Then a comparison of the output of the pressure rate of change value to a threshold value provides a way of calculating the height change of the barometric sensor, or a device containing same, based on the rate of change and the period over which the rate of change was determined. Test data shows that this approach provides accurate height determination for long elevator rides, but the accuracy tends to decrease as the length of elevator rides decrease.

In addition to using rate of change of pressure sensor measurements to adjust a height above ground value, another approach uses results from the first approach, discussed supra, in alternative combination with recording the pressure before the Pressure_Rate_of_Change meets a threshold and when Pressure_Rate_of_Change dips below the threshold.

Figure 2:
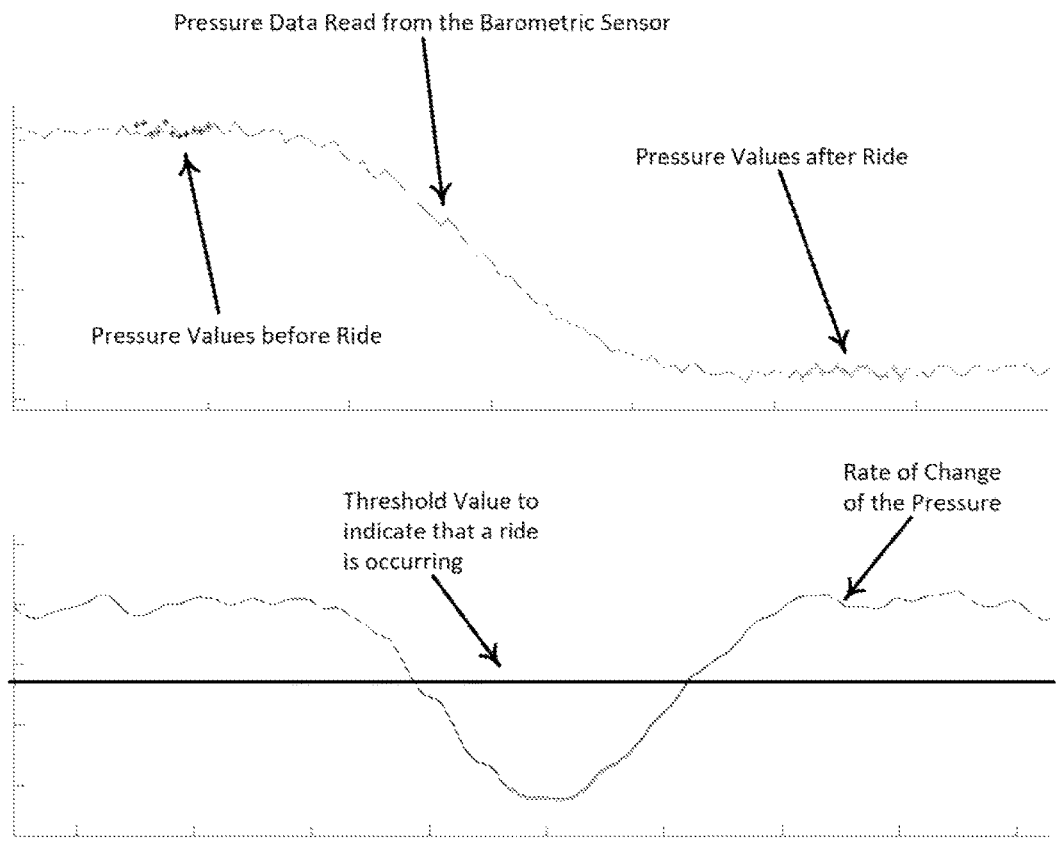
FIG. 2 illustrates a plot of barometer data demonstrating the pressure before and after an elevator event along with the linear regression output of slope from the barometer pressure data.

Turning now to FIG. 2, the figure illustrates a change in pressure associated with an elevator ride down two floors and the rate of change of pressure associated with the pressure measurement. The rate of change of pressure (pictured in the bottom part of the figure and calculated as the output of the linear regression and filtered in order to smooth the data) exceeds the threshold value and corresponds with a height change event.

Figure 3:
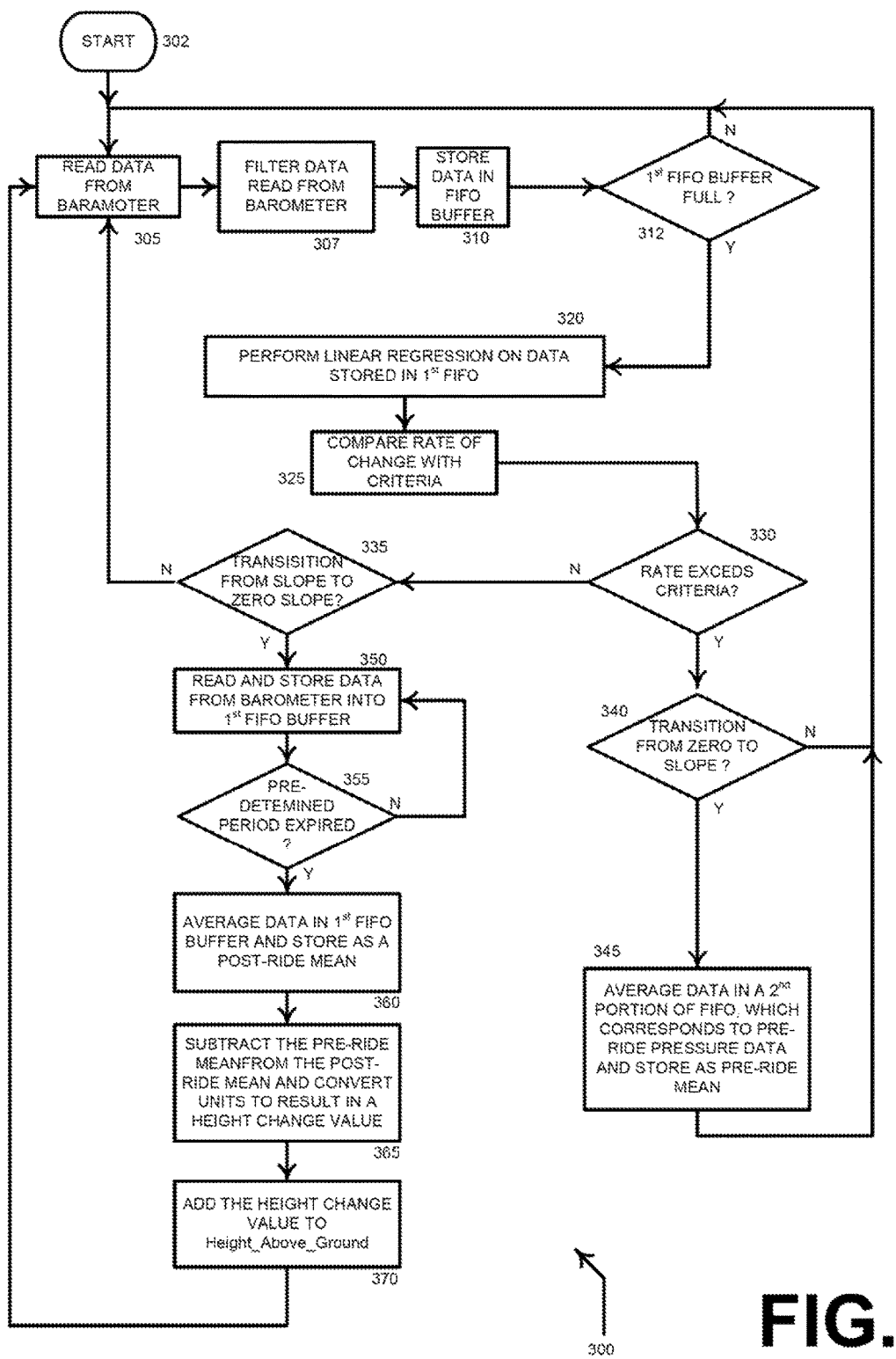
FIG. 3 illustrates a flow diagram of a method for height determination with GPS checks that uses a differential pressure before a rate of change to pressure after a rate of change approach to determine height.

Turning now to FIG. 3, the figure illustrates a method for calculating pressure values that correspond to the beginning and end of an elevator ride. Pressure data samples acquired prior to the beginning of an elevator ride, or event, are stored from a buffer, preferably a FIFO, to a different memory location. When the rate of change value, determined as discussed above, no longer exceeds a threshold value, or criterion, pressure data occurring after the point that the rate of change value (slope of the line) no longer exceeds the criterion and the pressure data samples are also stored from the FIFO to a third memory. Thus, the pre-ride values and the mean of the post-ride values are subtracted from each other to generate a difference of pressure values, or delta pressure, from before the ride to after the ride. This change in pressure corresponds to how much vertical distance the device has traveled above the ground. This approach provides accurate height change determination for short distances traveled. But, as discussed above, using the differential pressure approach provides lower accuracy for determining longer distances than the rate of change approach. The method illustrated in FIG. 3 also uses the GPS determination method 130 shown in FIG. 1 to decrease the probability of adjusting the height above ground value due to changes in elevation while riding in an automobile over undulating terrain.

Figure 4:
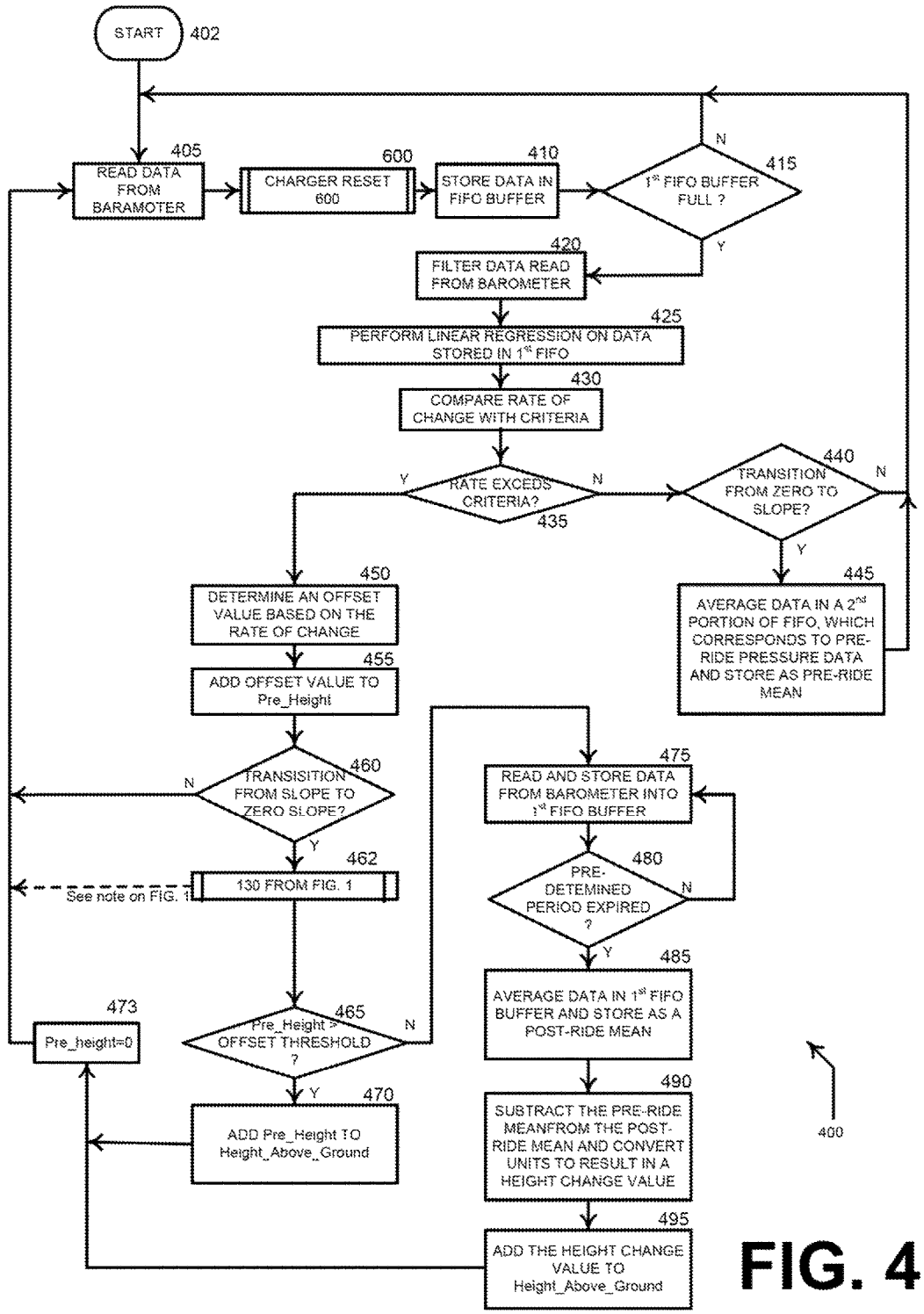
FIG. 4 illustrates a flow diagram of a method for height determination with GPS checks that uses a differential pressure before a rate of change to pressure after a rate of change in conjunction with a pressure rate of change approach to determine height.

Because the rate of change approach is more accurate for long elevation distances and the change in pressure approach is more accurate for measuring short elevation distance changes, the method shown in FIG. 4 uses a combination of the two to determine height. The height determination method uses the rate of change approach for long distances and the change in pressure approach for short distances. A vertical distance used to determine whether to perform one approach or the other approach is empirically determined by measuring error occurring by taking data with both approaches and calculating the height cutoff that produces the least amount of error. The value used to automatically select whether to use a rate of change approach or a height differential approach is configurable in a device performing the measuring, such as a PERS or MPERS. Empirically, data suggests that 50 feet is a transition value that results in the best overall accuracy, but as pressure sensors improve, and processing; circuitry increases in sophistication, the preferred vertical travel method determination selection value may change correspondingly.

Preferably, to determine how much a person has traveled in elevator applications, the height calculated is only added to Height_Above_Ground if the change is greater than 6 feet to eliminate extra processing involved with quick pressure changes. This also reduces power in applications where the GPS is turned on to perform more checks to eliminate false occurrences in the height changing.

Returning now to the description of FIG. 3, a processor of a PERS, MPERS, or other device starts at step 302 and progresses to step 305 with a pressure measuring sensor, reads/samples data from the pressure sensor. At step 307, the processor filters barometric pressure data received from the pressure sensor at step 307. At step 310, the processor stores samples read from the pressure sensor to a buffer, preferably a FIFO buffer. At step 312, the processor determines whether a first FIFO buffer has filled up. The first FIFO buffer may compose an entire buffer, or may be a portion of a larger memory buffer. If the first buffer is not full (the buffer typically is not full only when the device first boots up) method 300 returns to step 305.

If the processor determines that the first buffer is full at step 312, it evaluates data points stored in the first buffer and applies a linear regression function to determine a best-fit-line at step 320. At step 325 the processor compares the slope of the best fit hue with a predetermined criterion, or criteria.

The processor at step 330 determines whether the slope, or rate of change of pressure data, exceeds the predetermined criterion, or criteria, if the processor determined an absolute value of the magnitude of the slope of the best fit line, the processor compares the resultant slope magnitude to a predetermined criterion. If the slope determination includes a sign indicating direction of rate of change, the processor compares the determined slope to two criteria, each of the same magnitude but with different signs. If the slope determined at step 325 does not exceed the criterion, or is within the criteria, then method 300 advances to step 335.

Figure 5:
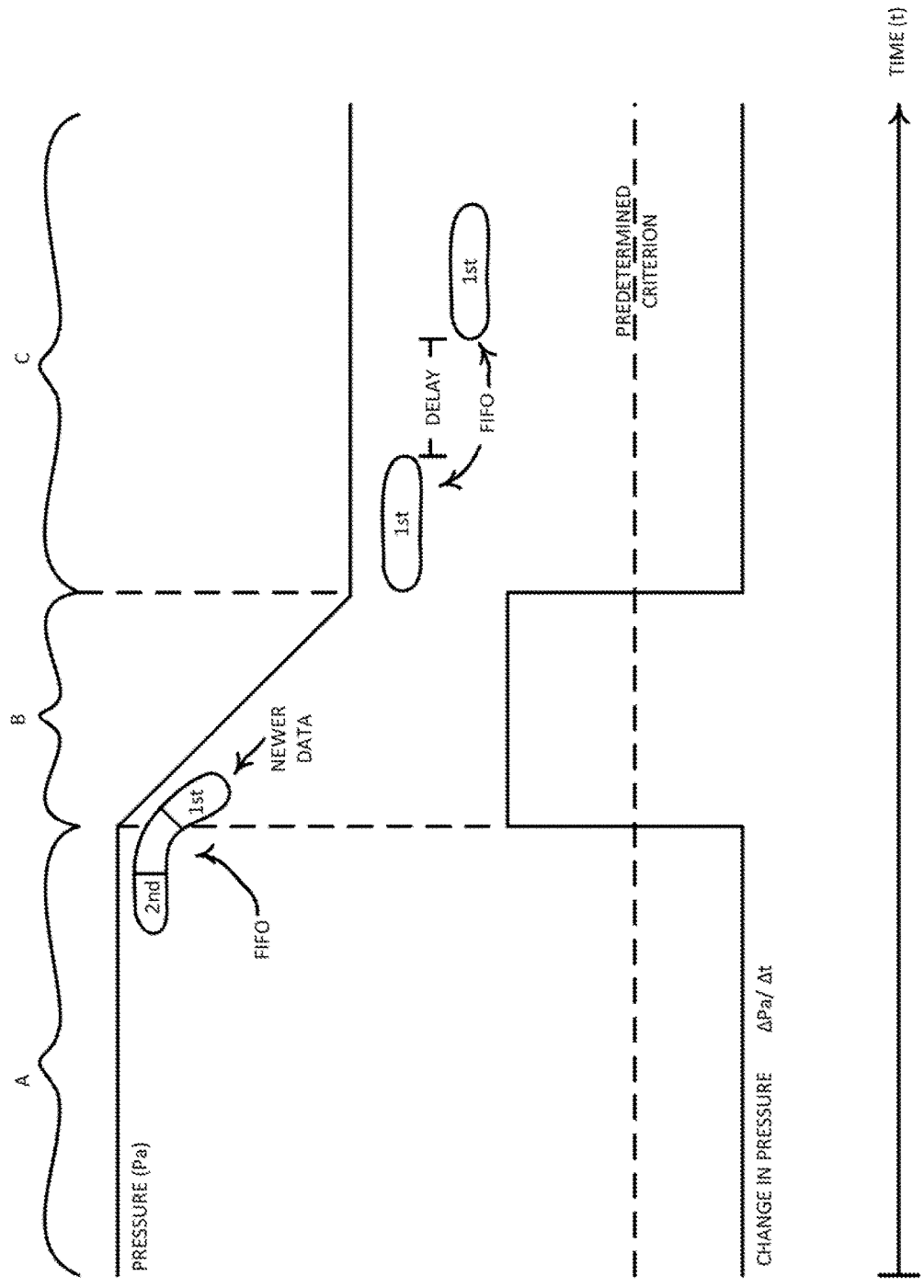
FIG. 5 shows a plot of theoretical pressure plot and its slope to illustrate the buffering process as discussed in method 300.

The processor then determines at step 335 whether the data from the first buffer analyzed at step 320 represents data substantially following a transition from region B to region C shown in FIG. 5. FIG. 5 illustrates a graphical representation pressure read from a barometric pressure sensor as a device containing the pressure sensor moves along with an elevator as a user of the device rides the elevator upward. One of ordinary skill will appreciate that the line representing pressure data slopes downward in region B because barometric pressure is inversely related to height. If the analysis of the data in the first buffer indicates a slope of a best fit line that does not exceed the predetermined criterion illustrated in FIG. 5, corresponds to pressure data following a transition from region B to region C, the processor returns to step 305 and acquires more data from the pressure sensor.

Returning to the description of the determination at step 330, if the determined slope exceeds the predetermined criterion, or falls outside the predetermined criteria, the processor performing the steps of method 300 advances to step 340. At step 340, the processor analyzes data in the second buffer and, in conjunction with the analysis of data in the first buffer, determines whether the slope value that exceeds the predetermined criterion occurred substantially immediately after the transition from region A to region B as shown in FIG. 5. If no, the processor determines that the data it analyzed from the first buffer corresponds to pressure changing as the elevator rises as shown by region B. If the elevator is still moving (region B) the processor returns from step 340 to step 305 and acquires more barometric pressure data.

If, however, the processor determines at step 340 that the data analyzed at step 325 corresponds to data substantially immediately after the transition from region A to region B, the processor averages the data in the second buffer. The processor then stores this averaged data to a memory at step 345; the average value stored at step 345 represents the barometric pressure measured by the pressure sensor in region A of FIG. 5. After storing the mean (average) value at step 345, the processor follows the diagram of method 300 and returns to step 305 and collects more pressure data. FIG. 5 illustrates that the FIFO buffer includes a first portion and a second portion ($1^{st}$ buffer and 2nd buffer). When analysis of the data stored in the first buffer indicates the device is changing position vertically, the processor averages data samples stored in the second buffer, which comprises older data samples vis-à-vis the first buffer—data samples in the second buffer typically are older data samples that have moved from the first buffer as it receives new data samples. The average of the data stored in the second buffer, as determined at step 345 represents the barometric pressure at the user device before the elevator ride begins. This average may be referred to herein as pre-ride pressure.

Returning to the discussion of step 335, if the processor determines that the data in the first buffer analyzed at step 325 corresponds to data acquired substantially immediately after the transition from region B to region C, the processor continues to collect data into the first FIFO buffer at step 350. The processor continues to collect data at step 350 until it determines at step 355 that a predetermined period, or timer, has expired. As the processor collects and stores to the first FIFO buffer each new sample of barometric pressure at step 350, the processor discards the oldest data sample from the first FIFO buffer. Thus, when the processor performs step 360 after having waited the predetermined period at step 355, the pressure data samples stored in the first FIFO buffer represent pressure data acquired after the predetermined period, which begins after the transition from region B to region C when the slope of the best fit line of the data in the first FIFO buffer dropped below the predetermined criterion. FIG. 5 illustrates this: the icon of the $1^{st}$ FIFO buffer immediately after the transition from region B to region C, but before the delay period, comprises data samples used in steps 325, 330, and 335. The rightmost icon of the $1^{st}$ FIFO buffer comprises pressure data collected after the delay period of step 355.

After the delay period, the processor averages the data stored in the first FIFO buffer at step 360 and stores the average as a post-ride mean barometric pressure value. At step 365, the processor subtracts the pre-ride mean pressure value as determined at step 345 from the post-ride pressure value as determined at step 365. This subtraction results in a differential pressure value representing the pressure change from before the elevator ride to after the ride. The processor then converts the pressure change to a height value by applying an appropriate factor the differential pressure value (typically 1 Pascal 0.27 feet). Thus, if the processor determined the pressure differential value as 50 Pascals, the processor would acid a value of 13.5 feet to a previously determined Height_Above_Ground value at step 370 before returning to step 305 and acquiring another barometric pressure data sample.

In Car Ground Height Reset (GPS Determination)

As described, above in reference to method 130 shown in FIG. 1, when a processor is configured to perform a method for determining the height of a device that includes itself, the method may generate a false positive result that indicates a rate of change when riding in an automobile that appears similar to a rate of change associated with an elevator ride. The use of GPS signals illustrated in method 130 can reduce the occurrence of the height determination method improperly recoding height changes while an automobile is traveling on the ground. Pressure changes that occur when going up and down hills in an automobile may falsely add to a measured height value. To distinguish height generated from an automobile ride (or ride in another type of vehicle such as a bus or a train or airplane) from height generated from an elevator ride, the processor turns on a GPS receiver to calculate GPS speed. If no GPS lock is obtained, the device processor determines that the device is in an elevator so height recently determined can be added or subtracted from the to the total height measurement above, the ground. If a GPS lock is obtainable then the speed from GPS circuitry of the device is measured and used to compare to a threshold value in order to see if the device is moving. It will be appreciated that a typical GPS receiver circuit can determine elevation, but GPS circuitry cannot determine elevation changes as accurately as a barometric pressure sensor. If the GPS receiver indicates that the device is moving (i.e., it latitude and longitude coordinates are changing) then a height measurement likely results from a device moving with an automobile, or other vehicle. The total height (Height_Above_Ground) is reset to zero because the device is within an automobile and traveling at ground level. If no speed is detected, it is highly probable that the device, is in an elevator so the height can be added to the total height (Height_Above_Ground). To minimize turning on the GPS receiver for long periods of time and thus consuming power, the processor suspends height determination during a delay period, which the processor bases on the speed that the automobile is traveling. The processor determines the delay according to speed based on the assumption that certain speeds, or speed ranges, typically correspond to certain road types and thus correspond to a given time before arriving at an elevator. For example, if GPS speed is 70 mph, the driver is most likely on an interstate and will take much longer to exit, make his, or her, way through traffic lights, park, and then walk to an elevator than if the GPS speed is 15 mph, which could correspond to the driver approaching, or actually driving in, a parking lot. In the later scenario when GPS speed is 15 mph, the time to the elevator is much less that when GPS speed is 70 mph.

Combination of Change in Pressure Aspect and Pressure Δ Before Height Change Event to after Height Change Event to More Accurately Determine Height Because the two methods described in reference to FIGS. 1, 3, and 5, supra, of determining the height above a reference point based on relative pressure measurements both have error associated with determining height, a combination of the two can be used to reduce error in calculating height. Empirical data shows that the approach that uses a rate of change (FIG. 1) to calculate a height has relatively little error for continuous pressure change events corresponding to a change of approximately 50 ft. The approach that uses the pressure data collected before a change in pressure and uses pressure values collected after a change in pressure (FIGS. 3 and 5) is more accurate than a rate of change pressure approach for values less than an empirically determined value of less than 50 ft.

FIG. 4 shows the two methods combined to reduce the total error associated with calculating the height off the ground. Included is the GPS determination method to determine the difference between riding in an automobile and riding in an elevator. The method shown in the figure determines which method to use based on an empirically determined threshold value chosen to reduce the error for short and long rides.

When the device is determined to be on the ground based on GPS speed the height is reset to zero to reduce the error associated with compounded height events. Method 400 as shown in FIG. 4 starts at step 402 and progresses to step 405. At step 405, the method samples data from an accelerometer using the same approach as outlined in methods 100 and 300. With a barometric pressure value obtained, step 405 progresses to step 600 that is subroutine, or method, 600 as described in reference to FIG. 6 herein. With method 600 having been performed, method 400 progresses to step 410 where the pressure sample value obtained in step 405 is stored into a FIFO buffer that maintains a historical representation of samples obtained from the barometric pressure sensor. Typical lengths for the buffers contain 3 seconds of data obtained at a sampling rate of 5 Hz. Progressing to step 415, once the FIFO buffer is filled as checked in this step, the method progresses to step 420 as indicated by the 'Y' path and if the FIFO buffer is not filled as indicated by 'N' path causing the method to progress back to step 405 to obtain another pressure data sample. At step 420, a filter is applied to the pressure data within the FIFO buffer that represents historical pressure data. The filter is typically a low pass filter for reducing or eliminating noise generated when measuring pressure values with a barometric pressure sensor. At step 425, linear regression is performed on data in the FIFO buffer to determine the rate of change trend of the pressure data collected. Progressing to step 430 the rate of change value is compared to a predetermined criteria that represents a threshold for the pressure applied to the device that indicates the device is moving up or down. Step 435 determines if the criteria is met—if so, the method progresses to step 450 as indicated by the 'Y' path and if not, the method follows the 'N' path and moves the method to 440. At step 440, the slope value generated in step 425 is evaluated to determine if the value is transitioning from a value of zero that indicates that no pressure change is occurring (e.g. the height of the device is not changing as indicated by zero slope) to a pressure change occurring (e.g. the height of the device is changing as indicated by slope). If no slope is present then the method follows the 'N' path back to step 405 and if slope is present then the method follows the 'Y' path to step 445 where a first portion of the FIFO buffer is used to calculate a pre-ride mean that indicates a pressure mean value just prior to a change in the device's height. Step 450 generates an offset value that is derived from the rate of change value and the amount of time over which a measured change in pressure has occurred. The offset is determined from knowing that 1 Pascal ("Pa") is equal to a change in height of 0.277 foot at sea level. The calculation of slope corresponds to a certain rate of change in Pascals based on the sample rate of the barometer and the number of samples in the FIFO buffer; the sample rate determines how fast the method is performed. Thus, a value representing an amount of change is calculated at step 450. Step 455 adds the calculated offset value to a value called Pre-Height and progresses to step 460. Step 460 determines from the rate of change criteria, whether the slope value that exceeded the criteria is now transitioning back to zero slope, thus indicating that pressure has stopped changing. If the examined signal indicates that pressure has stopped changing then the method follows the 'Y' path to step 462. Otherwise, the method progresses back to step 405 where more pressure sample(s) are obtained that further indicate if a device is changing in height.

At step 462, the method 130 described in reference to FIG. 1 runs and returns a GPS speed value (or goes back to step 405). A 'Y' determination at step 165 indicates whether the GPS speed exceeds, or is substantially greater than, (i.e., greater than human walking or running speeds) zero. If a speed value determined in 130 indicates that the device is traveling with a certain GPS speed method 400 transitions to step 405 and if the device is not traveling with horizontal speed then the method transitions to step 465.

At step 465, the method evaluates whether the Pre Height is greater than an Offset Threshold that is used to ensure that the height change was large versus a small change corresponding to a predetermined criteria. As discussed earlier, empirically determined data suggest that less error occurs when using a rate of change approach for large changes in height versus a smaller change in height (typically 50 feet is a transition height value defining small and large height changes, but other values could be used instead). For a smaller change in height, less error occurs when a method that calculates the relative pressure before and after the 'trip' or height change, as described supra, in reference to FIG. 3, is used to calculate height above the ground. If the height change is a large change the method follows the 'Y' path from step 465 to step 470 where the Pre_Height is added to the Height_Above_Ground that represents the height of the device above ground level. Method 400 then progresses to step 473 where the Pre_Height variable is reset to zero before, returning to step 405. If the determination at step 465 indicates that the Pre_Height value is small then method 400 progresses to step 475. At step 475 method 400 reads data from the barometer and stores it into a FIFO buffer to create a wait period during the transition of the slope, to zero so that data values indicative of pressure change within the buffer will be substantially unchanged before advancing to the next step. Step 480 functions as a timer to insure that a predetermined period elapses before progressing to step 485. At step 485 the method averages the pressure values in the FIFO buffer to eliminate noise and generates a Post_ride_Mean value. At step 490 the method subtracts the pre-ride mean variable from the post-ride mean variable and multiplies the difference by a scaling constant (0277 ft=1 Pascal) to convert the value to a height value. The height value is then added to the Height_Above_Ground value in step 495 and the method progresses to step 473.

Charger Height Reset

To reduce the compounded error associated with an extended number of height change events, which can over time make the determined height of a device susceptible to increased amounts of error, the device's height is reset to a charger height when a user places it on, or couples it with, a charger. In addition to a charger, the device's height may be reset when coupled to a home base station or another device within a home such as a computer, a rechargeable pad, a television, a radio, an appliance, or upon detection that the device is within wireless, or wired, presence of a device in the home. When a user initially provisions a device (i.e., when he, or she, first unpacks it from its shipping box) the user estimates a height of the charger. The user may also choose to reprovision the device when the charger is moved, or perhaps during a reset if needed. Because humans may err in estimating the charger's height, a method running in the wearable device automatically determines a charger elevation by using the user-supplied charger height as a starting point.

Figure 6:
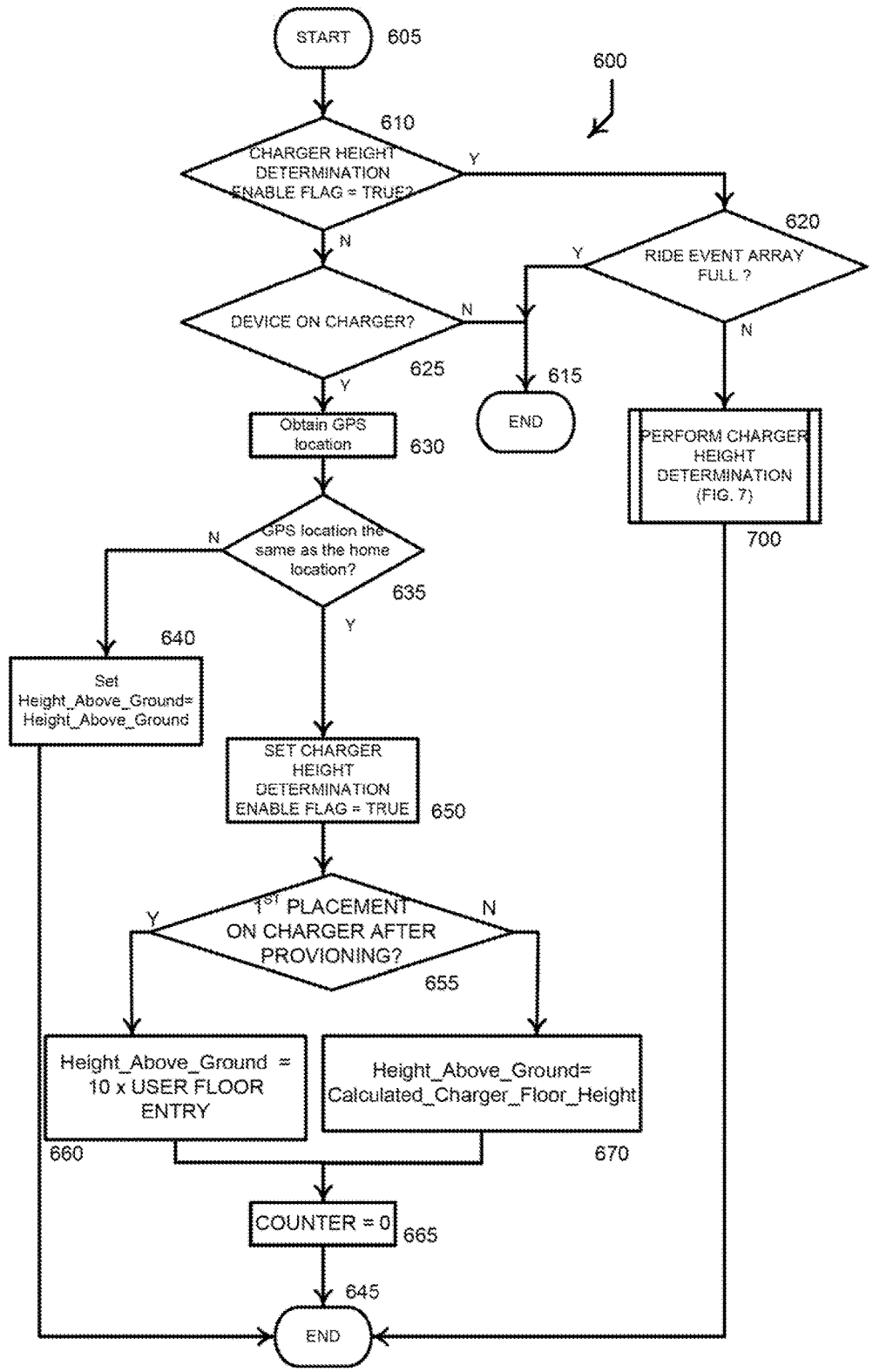
FIG. 6 illustrates a flow diagram of a method for height determination reset the charger height after placing the device on the charger.

FIG. 4 also shows a subroutine call to a method that the device may follow when on the charger for determining, or refining, the 'home base' height of the charger. FIG. 4 illustrates the device calling subroutine 600 shown in FIG. 6 after step 405. Method 400 includes the height determination method and also determines whether the device is on the charger. FIG. 6 illustrates method 600, a routine that the wearable device runs when placed on a charger.

When the device is placed on the charger, the charger height determination method 600 runs and calculates the charger height from an initial user-input height value. After starting at step 605, the device determines whether a charger height determination enable flag has been set to true at step 610. If the charger height determination flag is true, method 600 advances to step 620 and the device determines whether a ride event array is full. Use of the ride event array is explained in more detail in connection with the discussion of FIG. 7. For now, it is enough to know that the array stores values of height, each value corresponding to a predetermined number of changes following removal of a device from a charger, wherein the array fills up during height changes, typically from elevator rides, following initialization of the device. If the number of array values equals the predetermined number (based on the number of elevator rides occurring after device initialization) method 600 advances from step 620 and ends at step 615.

If, however, the array has not filled, meaning that the number of elevator rides after the initial setup of the device has not equaled the predetermined number, method 600 calls subroutine 700, which is described elsewhere herein infra. After subroutine 700 returns, method 600 ends at step 645.

Returning to discussion of step 610, if method 600 determines that the charger height determination enable flag has not been set to true, the device determines at step 625 whether the wearable device has been placed on, in, or coupled to, a charger. If no, method 600 ends at step 615. If yes, the device processor performs step 630 and obtains GPS location information, typically latitude and longitude coordinates, of the device's current position. Typically the device includes GPS circuitry and provides the location information to a processor of the device that is running method 600. At step 635, method 600 determines whether the GPS location information received from the GPS circuitry at step 630 substantially matches a stored value for a charger home base. The charger home base value is typically stored in a memory of the mobile/wearable device. If the GPS location information obtained at step 630 matches the stored value for the device's charger's home base location, at step 640 the device's processor stores in a memory the value of the current height of the device, calculated based on barometer sensor information as discussed elsewhere herein, as the height of the device and method 600 ends at step 645.

Returning to discussion of step 635, if the device determines that the current height of the device is substantially the value it has stored in it as its charger's home base location information (may not be exact because GPS or other location based determination errors may typically cause errors of plus or minus fifty meters with respect to the original stored position of the home), method 600 advances to step 650. At step 650, the device sets the charger height determination enable flag to true. The charger height enable determination flag indicates whether the device has already performed the charger height determination method after having been removed from a charger on a given occasion.

The home charger is a charger at a particular location, typically a user's residence location. When a device is placed on a charger at a location different from the home base location, the automatic charger height determination method will not operate to set an initial height or to reset the height to the calculated charger height because of the determination, discussed above performed at step 635. The charger height enable flag facilitates acquiring and processing elevator ride, information during each iteration of method 400, which typically operates at a predetermined frequency, for example seven times per second. Thus, the charger height determination flag being set to true permits advancing to subroutine 700 from step 620 at each iteration of the method 400.

At step 655 method 600 determines whether a given placement of a device on a charger is the wearable device's first placement on a charger. For example, during manufacture, a flag may be set to null. If method 600 determines the placement is the initial placement, it sets the flag and advances to step 660. Setting the flag will cause method 600 to follow the 'N' path to step 670 upon subsequent charger placements.

At step 660, method 600 receives a user-entered value for the number of building floors the charger's home base is above ground and stores the value to the Height_Above_Ground variable. Thus, the device operates with the assumption that current height of the device equals ten times the number of floors where the user has placed the charger. If method 600 determines at step 655 that a user has placed the device on a charger before, it stores a calculated height value to the Height_Above_Ground variable. Typically, the calculated height value is passed to method 600 when subroutine 700 returns, as described infra.

At step 665, a counter is set to zero. This counter reset at step 665 resets a counter that subroutine 700 will use as a delay timer that suspends storing of a height determination value when barometric sensor data indicates that motion of the device has ceased, or paused. This suspending of the storing of the output of the height determination result accounts for temporary stops along an elevator between starting and ending floors, and gives time for a typical elevator car to descend from to a ground floor. This is discussed in more detail infra. After resetting the timer counter at step 665, method 600 ends and returns control of the device to the method that called it, e.g., method 400 illustrated in FIG. 4.

Figure 7:
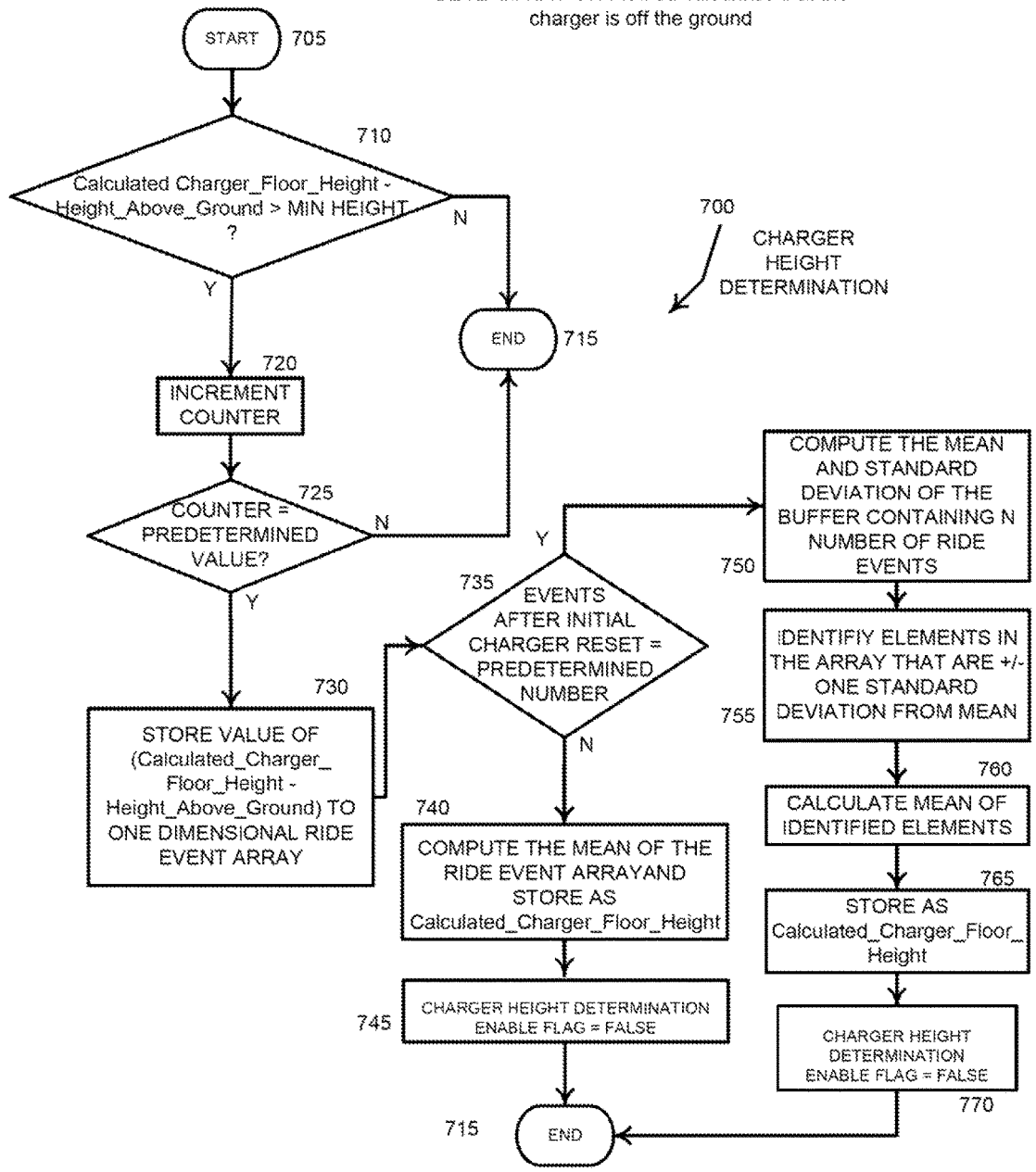
FIG. 7 illustrates a flow diagram of a method for a height determination training method to determine and refine a stored value for the charger's height.

Turning now to FIG. 7, the figure illustrates a method 700 for determining, or refining, the height of a charger used to charge a given PERS, MPERS, or other device used in a system for determining the location (latitude, longitude, and elevation) of the device. Other such devices may include RFID, or other tracking devices that are used to track packages in a warehouse; a device worn by a miner in a mine shaft; the elevation of a weather sensor; the elevation of equipment used in a large aquatic body; or other devices that may temporarily pause as they ascend or descend.

Method 700 starts at step 705 when called from method 600. At step 710, method 700 causes the processor in the device to determine the difference between the value calculated in method 600 based on the user-entered floor level and the value of the height above ground based on a current barometric pressure sensor reading. If the difference between these two values is not greater than a minimum charger height threshold value, method 700 ends at step 715 and returns to method 600 whence it was called. The minimum charger height value represents the minimum height a charger can be located based on a user's floor level entry. For example, since most, or practically no, buildings have a floor height of less than seven feet, multiplying seven feet times the user's entered floor where the charger, or other device, will reside (referred to herein as 'home base', 'home' or similar terminology) results in the minimum charger height threshold value. For example, if the user, while provisioning the wearable device with a computer application, an internet browser interface, a smartphone application, or similar, makes an entry that he, or she, and thus the charger, will reside on the seventh floor of a building, the device would use a minimum charger height threshold value of 7×7, or forty nine feet. Reference herein to charger height refers to the height of a charger with respect to the ground level elevation of its building's physical site.

If the difference in values determined at step 710 is greater than the minimum charger height value, then method 700 advances to step 720, increments the value of the counter that was initialized, or set to zero, at step 665 described in FIG. 6, and advances to step 725. The difference calculated at step 710 exceeding the threshold value typically occurs as the device is descending and has traveled downward from a current value stored as the charger height to a height lower than the threshold.

At step 725, method 700 determines whether the timer counter value equals a predetermined value. The predetermined value is configured to prevent storage of a determined charger height value (based on barometric pressure sensor data at a presumed ground level) into an elevator ride event array as discussed infra. The devices manufacturer may configure the predetermined period to a default corresponding to two minutes. For example, assuming a typical iteration rate of seven times per second (e.g., method 400 executes seven times per second and calls method 700 during each iteration) a predetermined counter limit of 840 would correspond to a suspension, wait, or pause, period, of two minutes before method 700 passes from step 725 to step 730. If the counter has not incremented to 840 (assuming 840 is the configured predetermined counter criteria) then method 700 advances from step 725 to step 715 and returns whence it was called in method 600.

A default of two minutes may be selected to account for a long elevator door opening/closing and/or long slow elevator descent during a trip from the charger's home floor to the building's ground floor. If not for the timer function, method 700 could erroneously use barometric pressure sensor data corresponding to a floor above ground (where an elevator temporarily stops on its descent to ground) as corresponding to the building's ground floor. Thus, as discussed, infra, implementing the pause delay counter/timer decreases the chance that method 700 will use an intermediate floor level instead of the ground level to adjust the currently stored charger's height before storing the adjusted charger height value into the ride event array in step 730.

The ride event array stores a predetermined number of values corresponding to the predetermined number of elevator descent, or down-ride, events following initialization and provisioning of a device with its corresponding home, or base, charger. A user may change the predetermined wait, pause, or suspend period during provisioning to account for very slow elevator stops and travel, but a manufacturing factory default wait period, or number of counts, typically will be configured to cover most elevator stop and trips of a typical commercial elevator for carrying people in public buildings.

At step 730, method 700 stores a value into the ride event array. The value stored is the difference between the Height_Above_Ground height determined from a height determination method (e.g., methods 100, 300, 400, etc.) and the value currently stored as the charger's height above ground, which is referred to herein as calculated_charger_floor_height. Since following the 'Y' path from step 710 occurs when the difference between a currently stored value of the home charger's height and the current height above ground (typically from barometric pressure sensor) exceeds the predetermined minimum threshold, the wearable device will not perform steps 725 and 730 until the device has begun a descent between floors rather than just a descent from the top of a dresser to a floor of a room for example. And, since method 700 does not advance to step 730 until the timer of step 725 has counted to its end, the device stores the ride length to the array at step 730 with a reasonable level of confidence that the device has actually attained ground level before storing. This calibration is presumed accurate because immediately before the descent, or elevator ride, began the calculated charger height and the height above ground (real time barometric pressure sensor data) were the same value—at least the second and subsequent times method 600 shown in FIG. 6 performed step 670. When step 660 is performed (only the first time after provisioning the device) the current height above ground is the estimated/provisioned value based on user entry of the home base floor within the building. Therefore, the value corresponding to the first descent will provide a refined height with respect to the initial provisioned value, which may have a high error if the user entered an incorrect floor, did not account properly for a building without a thirteenth floor, or the building has floor levels that differ from ten feet. Upon subsequent descents/rides, the difference calculated at step 730 between a current value stored in the device as the charger height and the ground level as determined from barometric pressure sensor data will likely be less than the difference following the initial descent.

At step 735, method 700 determines whether the ride event array has been filled up with values corresponding to different ride events following instances of removing a device from a charger. If method 700 determines that the array is not full, the method advances to step 740. At step 740, the device calculates the mean of all of the values stored in the ride event array and stores this calculated mean as a new charger home floor height. After storing the mean of the ride event array as the revised charger floor height, method 700 sets the charger height determination enable flag to false at step 745, and ends at step 715, whereupon control passes back to method 600 whence method 700 was called.

Returning to discussion of step 735, if method 700 determines that the number of ride event values stored in the ride event array equals the predetermined number of ride events (i.e., the buffer that stores the array is full), the method advances to step 750. At step 750, method 700 computes the mean and standard deviation of the values stored in the ride event array. At step 755, method 700 causes the wearable device to identify ride event values that are within one standard deviation from the mean. This process effectively discards outlier values before performing further analysis. For example, an outlier may be the adjusted charger height as determined following the initial elevator descent following set up of the device and its charger. Another outlier may be the result of unsettled weather than causes the ambient barometric pressure to vary from the beginning of the ride at a high elevation to the ground floor. Or, the pressure in a ground floor lobby may be higher than the pressure in the user's residence if he had his windows open before beginning his elevator ride.

Thus, when the device at step 760 calculates the mean of the remaining ride event values after excluding the outliers from the ride event array, and at step 765 stores the statistically improved mean of the ride events other than the outliers, the device has now updated, or calibrated, the value it stores internally as its home charger's home elevation within the user's building. At step 770, the device sets the charger determination enable flag to false, ends at step 715, and control returns to method 600 whence method 700 was called.

Therefore, following the performance of step 770 in method 700, upon the next iteration of method 400 shown in FIG. 4, when method 400 calls the charger reset method 600, and control passes to method 600 shown in FIG. 6, the ride event array will be full, and this method 600 will end at step 615 passing control back to method 400. Accordingly, unless a user affirmatively uses provisioning software (smart phone application, internet browser, computer application with the device couple to the computer, or other similar means) to over ride the calibrated home charger height, method 700 will not execute again after the initial calibration phase that includes the number of ride events corresponding to the number of array positions in the ride event array.

A user inputs values for the home charger's location and height via an interface running on a device such as, for example a personal computer, a tablet device, or a smart phone device, or some similar device.

The step of verifying the location of the charger ensures that the charger is present within the location of the home-base charger. During this step of verifying, the location determination method compares the location of the home charger stored in the device to a location determined from obtaining GPS coordinates when the device senses it is being charged. If these values substantially match (perhaps within a predetermined tolerance) and the device is in fact on, or coupled to, the home charger (based on coordinates or other location information) then the current height value of the device is set to the value stored in the variable Charger_Height and the Charger_Height_Determination is enabled.

FIG. 7 illustrates a method for determining the charger's height. This method refines the stored home base charger height, which may have been incorrectly entered upon initial set up, or may not accurately reflect the home of the home charger for another reason.

The method checks whether the placement on (or coupling to) the charger is the first time that the device is placed on the particular charger (a simple indication is a counter that counts the number of times that the device is placed on the charger). If the placement is indeed the first time that the device is placed on the charger, an estimation of height off the ground is generated. The estimation typically includes a user entering through a web interface, or other application interlace, a number of floors above ground. In addition, the provisioning interface may inquire, or provide an entry field for other information, such as whether the building the charger is to be based in has a 13$^{th}$ floor, and the height of each floor. If the user supplies a height off the ground in terms of the number of floors of a building, a default value of 10 ft. per floor numbers as entered by a user is set as the initial charger floor height.

Upon removal from the charger, the method compares a periodic height determination, based on barometer sensor signals, with a threshold generated by the user-entered floor height. Preferably, the threshold value is an empirically determined number that is the minimum distance in feet that is calculated for a given floor height. For example, if a user-entered floor height is 4 floors then a possible minimum height off the ground would be 7 ft*4 floors=28 feet (most building do not have stories less than seven feet). As the height determination methods described above periodically calculate the device's height after it has been removed from a charger, the method running in the device increments a counter when the difference between a current value of the home charger's height and the current height of the device exceeds the threshold, or minimum, value for the charger's height, which is initially based on the floor of the building it is provisioned for. If the current height minus the charger height does not exceed the threshold value, the method ends.

When the method running on the device determines that the charger height minus the current height above the ground exceeds the threshold value, it starts a counter, or timer, of a predetermined value selected to account for time for descent from the charger home base floor the ground floor of the building. When the counter has expired, the estimated height, based on current height information from the barometric pressure sensor, that the device traveled from the charger to the ground is stored into an array, which may be referred to herein as a one-dimensional ride event array. Following multiple ride events after a device and its charger have been provisioned, enough data will exist in the ride event array to statistically analyze the data set. The number of ride events is preferably predetermined—the array has a predetermined number of storage areas for a corresponding, number of heights associated with ride events. Until more data becomes available, the mean of all the historical charger height estimates that have occurred is recorded.

Charger Height Learning

As the number of charger height data points collected from multiple ride events and stored to the ride event array becomes larger, large enough to take the mean and standard deviation of the data set, a method is implemented in order to rule out outliers in the data set of charger height determinations (shown in FIG. 7). The mean and standard deviation of the predetermined number of charger height values collected is calculated. The mean of all the data points within one standard deviation from the mean of all the data set is then calculated. This process reduces the number of outliers that can skew the data from the actual charger height. An example where outliers in the data is possible would occur in charger height determination trials that a person lives on the 20th floor of a building and decides to visit the 3rd floor a number of times after resetting the device on the charger. Using the mean and standard deviations reduces the effect of data points corresponding to 3rd floor outliers, for example, that skew the data set away from measured charger height determinations where the person went to the ground floor.

Other Height Resets

Figure 8:
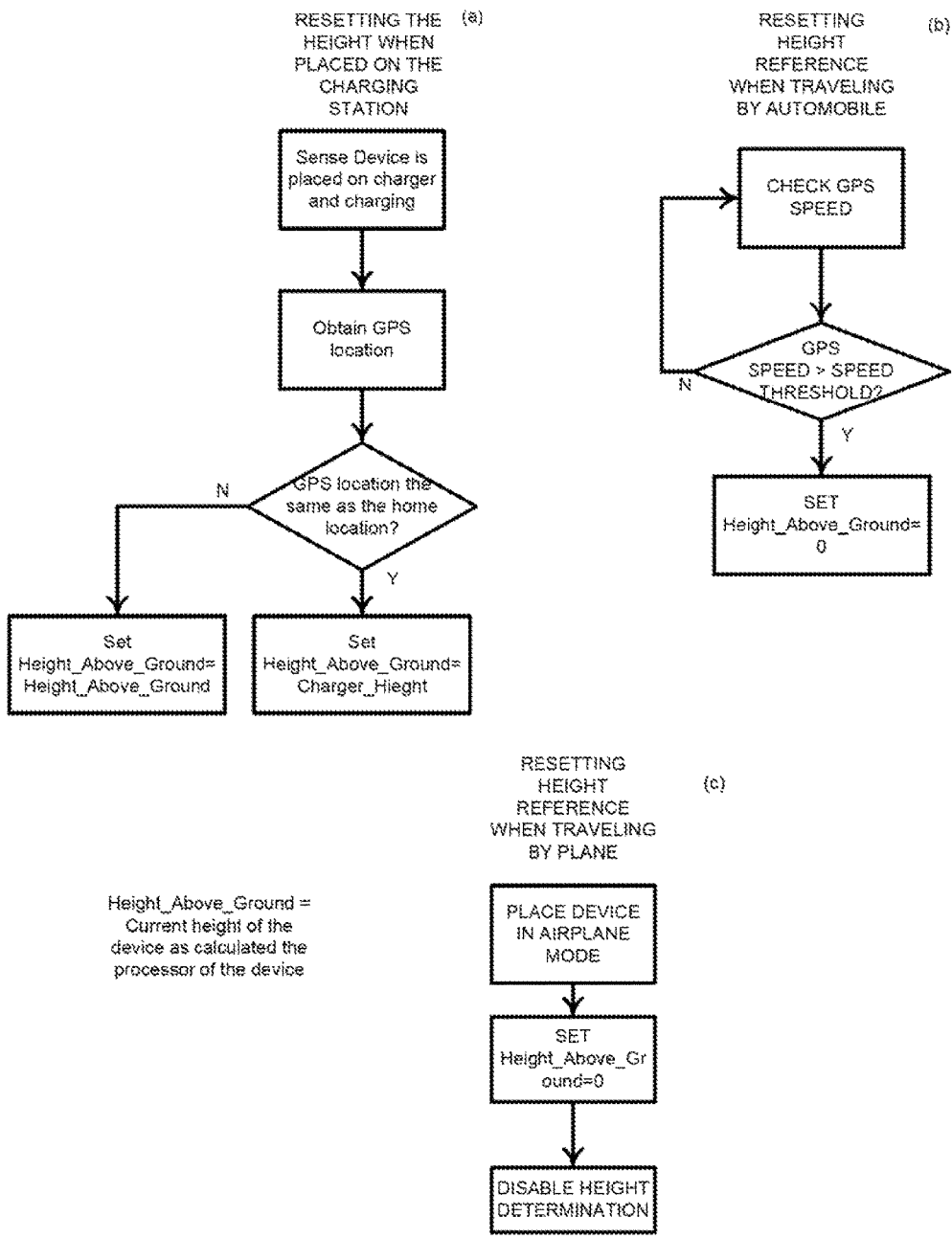
FIG. 8 illustrates a flow diagram of a method to sense when the device is placed on the charger, sensed in an automobile, or traveling by plane.

False height adjustments that occur when trying to measure the height off the ground and solutions thereto are shown in FIG. 8. FIG. 8(a) shows a scenario of a device placed on a charger, the charger height is known, and then the device resets to the charger height. In FIG. 8(b) if the device is sensed to be in an Automobile, a GPS lock is obtained and it is used to check the GPS speed. If GPS speed is greater than a certain threshold value that would be indicative of traveling in an automobile then the height_above_ground is set to zero because automobiles, and most other vehicles, typically travel on the ground. If the device has the ability to be placed into an airplane mode, the height determination method should be disabled and height should be reset to zero. This is shown in FIG. 8(c).

Included is a GPS determination method that is discussed in more detail elsewhere herein to differentiate between the false positive of riding in a car versus the true positive of riding in an elevator that results in a change in height.

Other Aspects

In an aspect, the processor of the wearable device causes the location determining circuit, component, or device coupled to it, to enter an 'awake' state and seek a lock to signals from satellites or other communication devices such as, for example, wireless or cellular telephony towers, Wi-Fi hot spots, or other similar means for transmitting signals used for determining location of a receiving device. The device would cause the location determining circuit to perform the seeking of a signal lock upon determining that the device has undergone a height change and that the height change has exceeded a threshold, as discussed above in connection with FIGS. 1, 3, and 4. The device preferably seeks a signal lock for a predetermined period, and if a lock is not acquired within the predetermined period, the processor causes the location determining device to enter a sleep, or low power, mode and the processor, performing one of the previously discussed height determining methods, or other methods not described herein, adds the determined change in height to the currently stored value for the device's height above ground and stores the sum as the new height above ground value. This prevents the location determining device from entering an awake state when the change of height occurs in an elevator where the latitude and longitude of the device is not changing substantially.

In addition to using the height determination methods described above, the device may also include accelerometer components and use them to classify acceleration data obtained from, for example, a 3-axis accelerometer. This data can be used to detect activity levels associated with walking, running, general activity, movements typical of riding in cars or other acceleration-based signatures. An addition to FIG. 4's height determination method can process acceleration data corresponding to detected activity in conjunction with processing data corresponding, to rate of pressure change and a pressure change before the ride event compared to after the ride event has occurred to calculate the height off the surface of the earth. Once the method in FIG. 4 determines that height based on pressure should be added to the Height_Above_Ground (shown in FIG. 4), acceleration data is analyzed that corresponds to the accelerations during the change in height event. This data is analyzed by means of a pedometer method to extract data and information that indicate whether steps (walking, running, climbing, etc.) are taken during the time period that the pressure changed to indicate a certain value of height should be added to Height_Above_Ground. To only include data in the calculation of height above ground that results from elevator rides, a determination can be made whether the number of steps taken during the portion of time is above a certain predetermined amount, and if so conclude that the user of the device is walking either up hills or upstairs. The associated height recorded during this time is not added to the Height_Above_Ground because it is assumed that the person wearing the device, is not traveling in an elevator and is traveling by foot. Likewise, the same methodology can be applied by using an activity monitoring method that senses using the magnitude of the acceleration of data, the amount of acceleration incidents occur during, a ride event. If the data from acceleration incidents surpass predetermined criteria that corresponds to normal activity during an elevator ride then the vertical distance traveled can be neglected and assume it was a person traveling up a hill or stairs. Acceleration data can be used to classify the difference between a typical elevator ride and the occurrence of riding in a car. The data from a typical car ride will include more acceleration incidents than that of an elevator ride so it can be determined if the device is potentially in a car verses an elevator and the height change cannot be included.

These and many other objects and advantages will be readily apparent to one skilled in the art from the foregoing specification when read in conjunction with the appended drawings. It is to be understood that the embodiments herein illustrated are examples only, and that the scope of the invention is to be defined by the claims when accorded a full range of equivalents.

What is claimed is:

1. A method comprising:
    receiving, by a device, barometric pressure data samples from a barometric pressure sensor;
    storing, by the device, the barometric pressure data samples in a buffer;
    evaluating, by the device, the barometric pressure data samples to determine a best fit line that represents a change in height of the device;
    determining, by the device, that the barometric pressure data samples in the buffer represent data substantially following a transition to a zero slope;
    determining, by the device and based on determining that the barometric pressure data samples in the buffer represent data substantially following the transition to the zero slope, a slope over a slope period commencing with one of one or more barometric data sample times that substantially correspond to transitioning from the zero slope to a non-zero slope and ending with a sample time substantially corresponding to the transition to the zero slope;
    applying, by the device, power to a global positioning system (GPS) component based on the determined slope;
    receiving, by the device, a GPS signal based on applying the power to the GPS component;
    determining, by the device, movement information corresponding to the device based on the GPS signal;
    determining, by the device, whether a threshold is satisfied based on the movement information corresponding to the device; and
    selectively:
        setting, by the device and when the threshold is satisfied, a wait time that delays reading more barometric pressure data samples from the barometric pressure sensor and delays a next time at which more power is applied to the GPS component; or
        determining, by the device and when the threshold is not satisfied, a change-in-height offset value based on the determined slope over the slope period and based on the slope period; and applying, by the device and when the threshold is not satisfied, the change-in-height offset value or a differential change-in-height value to a previously determined current height value of the device based on the change-in-height offset value.

2. The method of claim 1, further comprising:
setting to zero the previously determined current height value when the threshold is satisfied.

3. The method of claim 1, further comprising:
entering a wait state for the wait time when the threshold is satisfied.

4. The method of claim 1, wherein the GPS component includes GPS circuitry.

5. The method of claim 1, wherein the movement information corresponds to a speed of the device.

6. The method of claim 1, wherein the determined slope is compared to a first criterion for movement in an ascending direction and a second criterion for movement in a descending direction.

7. A system comprising:
a device to:
receive data corresponding to barometric pressure data samples from a barometric pressure sensor;
store the barometric pressure data samples in a first memory;
evaluate the data corresponding to the barometric pressure data samples to determine a best fit line that represents a change in height of the device;
determine that the barometric pressure data samples in the first memory represent data substantially following a transition to a zero slope;
determine, based on determining that the barometric pressure data samples in the first memory represent data substantially following the transition to the zero slope, a slope over a slope period;
apply power to a global positioning system (GPS) component based on the determined slope;
receive a GPS signal based on applying the power to the GPS component;
determine movement information corresponding to the device based on the GPS signal;
determine whether a threshold is satisfied based on the movement information corresponding to the device; and
selectively:
set, when the threshold is satisfied, a wait time that delays reading more barometric pressure data samples from the barometric pressure sensor and delays a next time at which more power is applied to the GPS component; or
determine, when the threshold is not satisfied, a change-in-height offset value based on the determined slope over the slope period and based on the slope period; and
apply, when the threshold is not satisfied, the change-in-height offset value to a previously determined current height value of the device based on the change-in-height offset value.

8. The system of claim 7, wherein the device is further to:
enter a wait state based on the wait time.

9. The system of claim 8, wherein the GPS component includes GPS circuitry.

10. The system of claim 8, wherein the movement information corresponds to a speed of the device.

11. The system of claim 7, wherein the determined slope is compared to a first criterion for movement in an ascending direction and a second criterion for movement in a descending direction.

12. A device comprising:
a processor to:
receive barometric pressure data samples from a barometric pressure sensor;
store the barometric pressure data samples in a buffer;
determine that the barometric pressure data samples in the buffer represent data substantially following a transition to a zero slope;
determine, based on determining that the barometric pressure data samples in the buffer represent data substantially following the transition to the zero slope, a slope over a slope period;
apply power to a global positioning system (GPS) component based on the determined slope;
receive a GPS signal based on applying the power to the GPS component;
determine movement information corresponding to the device based on the GPS signal;
determine whether a threshold is satisfied based on the movement information corresponding to the device; and
selectively:
set, when the threshold is satisfied, a wait time that delays reading more barometric pressure data samples from the barometric pressure sensor and delays a next time at which more power is applied to the GPS component; or
determine, when the threshold is not satisfied, an offset value based on the determined slope over the slope period and based on the slope period; and
apply, when the threshold is not satisfied, the offset value to a current height value based on the offset value.

13. The device of claim 12, wherein the processor is further to:
evaluate the barometric pressure data samples to determine a change in height of the device.

14. The device of claim 12, wherein the processor is further to:
set to zero a previously determined current height value when the threshold is satisfied.

15. The device of claim 12, wherein the processor is further to:
enter a wait state for a period, that corresponds to the wait time when the threshold is satisfied.

16. The device of claim 12, wherein the GPS component includes global positioning circuitry for indicating that at least one of a latitude or a longitude coordinate has changed.

17. The device of claim 12, wherein the movement information corresponds to a speed of the device.

18. The device of claim 12, wherein the determined slope is compared to a first criterion for movement in an ascending direction and a second criterion for movement in a descending direction.

19. The device of claim 12, wherein the barometric pressure sensor is included in one of:
a smartphone,
a user wearable device,
a home improvement device, or
a luggage tracking device.

20. The device of claim 12, wherein the barometric pressure sensor is included in one of:
   a personal emergency response system (PERS), or
   a mobile personal emergency response system (PERS).

* * * * *